United States Patent
Watt et al.

(10) Patent No.: US 7,345,448 B2
(45) Date of Patent: Mar. 18, 2008

(54) ADAPTIVE COMMAND FILTERING FOR SERVOMECHANISM CONTROL SYSTEMS

(75) Inventors: David Watt, Newark, CA (US); Mehmet Alpay, Portland, OR (US); Mark Unrath, Portland, OR (US); John Wen, Melrose, NY (US); Ben Potsaid, Troy, NY (US)

(73) Assignee: Electro Scientific Industries, Inc., Portland, OR (US)

( * ) Notice: Subject to any disclaimer, the term of this patent is extended or adjusted under 35 U.S.C. 154(b) by 6 days.

(21) Appl. No.: 11/129,059

(22) Filed: May 12, 2005

(65) Prior Publication Data

US 2005/0285558 A1 Dec. 29, 2005

Related U.S. Application Data

(60) Provisional application No. 60/571,442, filed on May 14, 2004.

(51) Int. Cl.
*G05B 13/02* (2006.01)
(52) U.S. Cl. ............... 318/632; 318/600; 318/621
(58) Field of Classification Search ........ 318/600–604, 318/621, 632, 636
See application file for complete search history.

(56) References Cited

U.S. PATENT DOCUMENTS

| | | | | |
|---|---|---|---|---|
| 4,298,833 A | * | 11/1981 | Edwards et al. | ............ 318/561 |
| 4,866,361 A | * | 9/1989 | Donley et al. | ............... 318/584 |
| 5,073,747 A | * | 12/1991 | Dupraz et al. | ............... 318/561 |
| 5,311,110 A | * | 5/1994 | Iwashita | ................. 318/568.15 |
| 5,723,965 A | * | 3/1998 | Yim | ............................ 318/601 |
| 5,822,143 A | | 10/1998 | Cloke et al. | |
| 5,875,066 A | | 2/1999 | Ottesen | |
| 7,015,670 B2 | * | 3/2006 | Polcuch | ....................... 318/632 |
| 2004/0135534 A1 | | 7/2004 | Cullen | |

FOREIGN PATENT DOCUMENTS

EP 0 296 638 A3 12/1988
JP 11231905 8/1999

* cited by examiner

*Primary Examiner*—Bentsu Ro
(74) *Attorney, Agent, or Firm*—Stoel Rives LLP

(57) ABSTRACT

Preferred embodiments of the invention implement techniques for modifying the command trajectory, the architecture of a servomechanism control system, or both, to reduce the servo error during and/or after the command trajectory. An iterative refinement procedure generates for use by the servomechanism control system a corrective input, du, which significantly reduces the error between the desired and actual servomechanism control system outputs. In one embodiment, a uniquely identified plant model is employed in the iterative refinement procedure to compute an approximate gradient that improves the performance and reliability of the refinement procedure. In another embodiment, the actual plant response is used in place of the identified model in the iterative refinement procedure. This is accomplished by time-reversing the stored error signal from a training run, before applying it to the plant to generate an update to the corrective input signal du.

16 Claims, 2 Drawing Sheets

_US 7,345,448 B2_

ADAPTIVE COMMAND FILTERING FOR SERVOMECHANISM CONTROL SYSTEMS

RELATED APPLICATION

This application claims benefit of U.S. provisional patent application No. 60/571,442, filed May 14, 2004.

FEDERALLY SPONSORED RESEARCH OR DEVELOPMENT

This invention was made with United States government support pursuant to Gran No. GMS-0301827 from the National Science Foundation. The United States has certain rights to this invention.

COPYRIGHT NOTICE

©2005 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention relates to servomechanism control systems and, in particular, to a high performance servomechanism control system and method implemented with feedforward compensation and feedback control to improve system speed and accuracy.

BACKGROUND OF THE INVENTION

Typical servomechanism control systems are implemented with feedback and feedforward elements, which cooperate to produce a response to a command input. In general, the servomechanism system error (the difference between the command input and the system output in response to the command input) will be significant during and after a typical command trajectory. If high accuracy of the output is desired, settling time is allocated to allow the output of the system to settle to the command position within a specified operational error tolerance. Additional techniques are desired to reduce or eliminate the settling time and thereby enhance high performance servomechanism control.

SUMMARY OF THE INVENTION

Preferred embodiments of the invention implement techniques for modifying the command trajectory, the architecture of a servomechanism control system, or both, to reduce the servo error during and/or after the command trajectory.

An iterative refinement procedure generates for use by the servomechanism control system a corrective input, du, which significantly reduces the error between the desired and actual servomechanism control system outputs. In one embodiment, a uniquely identified plant model is employed in the iterative refinement procedure to compute an approximate gradient that improves the performance and reliability of the refinement procedure. In another embodiment, the actual plant response is used in place of the identified model in the iterative refinement procedure. This is accomplished by time-reversing the stored error signal from a training run, before applying it to the plant to generate an update to the corrective input signal du.

The iterative refinement procedure entails using a typical plant model in place of a uniquely identified model for each particular plant to simplify and accelerate the iterative refinement procedure. An input stream of characteristic move trajectories is used in the training process to develop a corrective signal du that optimizes the servomechanism response for that particular input stream. The training trajectories and resulting du correction are then used to design a corrective input generator preferably implemented with a FIR filter that generates a du corrective signal for an arbitrary command trajectory.

This invention optimizes servomechanism control system performance by accounting for tolerances and variations specific to each set of hardware, without necessarily requiring the use of complex servomechanism control system model identification. This optimization is applicable even when the servomechanism control system is driven by arbitrary command trajectories.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
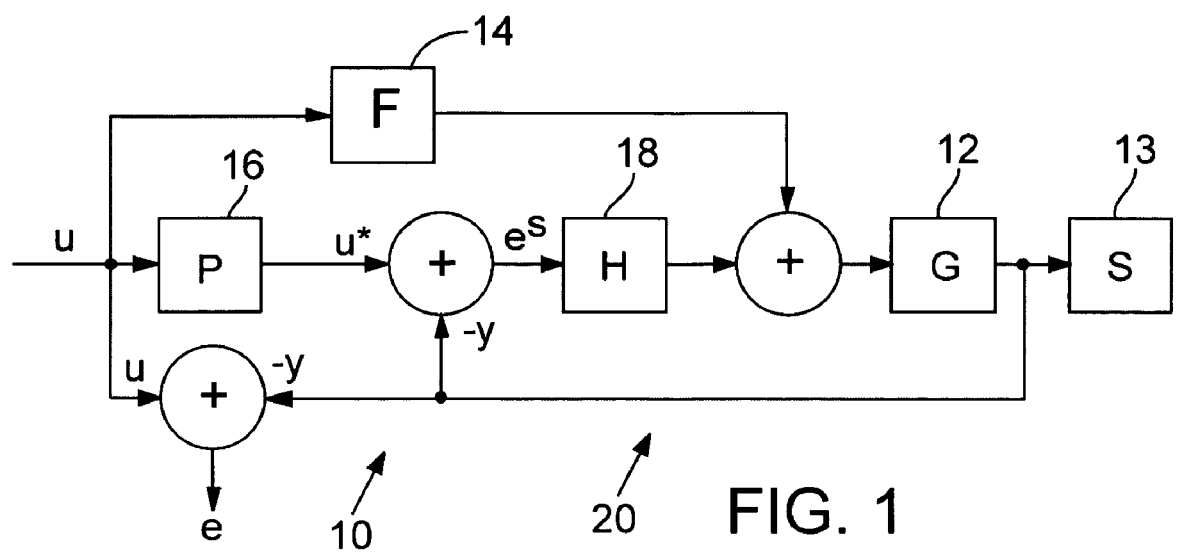
FIG. 1 shows the architecture of a servomechanism control system designed to achieve high-speed, precise operation of a physical plant.

FIG. 1 shows the architecture of a motion control system 10 designed to achieve high-speed, precise operation of a physical plant (G) 12. In a preferred embodiment, physical plant 12 is a high-speed scanner composed of scanning, mirrors commonly used in high performance laser micromachining and power drive electronics. Control system 10 is configured to improve the motion performance of one of the scanning mirrors of the high-speed scanner. The feedback signal, y, that is used to close the servo loop is measured through a joint encoder forming a part of the scanner. A dynamic transfer function (S) 13 models the coupling between the measured (feedback) position and the actual scanning mirror position. Separate design control systems 10 can be similarly configured for the other scanning mirror or other scanning mirrors of the high-speed scanner.

Control system 10 receives a move command input stream applied to a feedforward controller (F) 14 and a corrective input generator (P) 16. The move command input stream can contain position, velocity, and acceleration components, or feedforward controller 14 can be implemented to expand a move command to compute these components. The output of feedforward controller 14 and the output of corrective input generator 16 are applied through associated summing junctions to, respectively, plant 12 and a feedback controller (H) 18 of a servomechanism loop 20. Feedforward controller 14 is designed to match the inverse of the dynamics of plant 12 within a limited frequency range to improve plant tracking performance at higher frequencies. Corrective input generator 16 profiles the move command input stream, u, to produce a refined input stream, u*, that compensates for the remaining closed-loop imperfections to further improve the servomechanism performance. The design, construction, and operation of corrective input generator 16 is described in complete detail below.

In the preferred embodiment described, physical plant 12 is a Model 6220H Moving Magnet Closed Loop Galvanometer Based Optical Scanner manufactured by Cambridge Technology, Inc., Cambridge, Mass., and a suitable power drive. Feedforward controller 14 and feedback controller 18 are preferably combined in a digital galvanometer controller, which a skilled person could readily design to provide a 5 kHz closed-loop system bandwidth in an implementation using the Model 6220H galvanometer.

Figure 2:
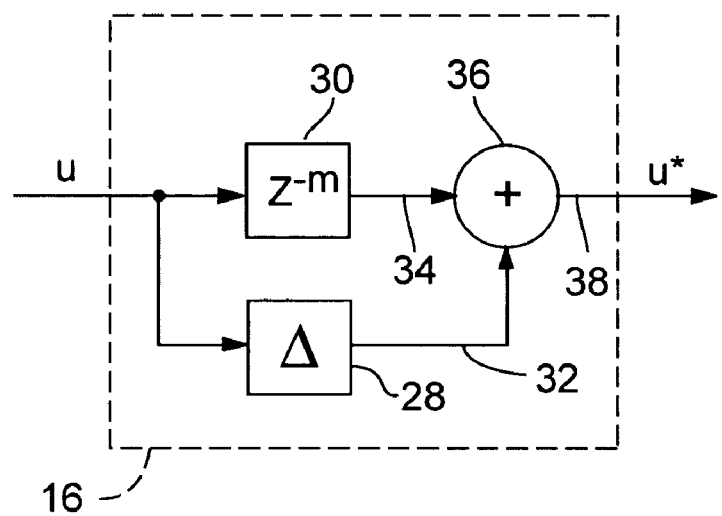
FIG. 2 is a block diagram of a corrective input generator that refines the input command stream applied to the control system of FIG. 1.

FIG. 2 shows a block diagram of corrective input generator 16 in preferred implementation includes a finite impulse response (FIR) filter 28, which corrects for deviations of output signal y from ideal behavior. With reference to FIG. 2, corrective input generator 16 receives move command input stream u and applies it to a delay module 30 and to FIR filter 28 to advance its output 32 with respect to the direct signal path of move command input stream u. An output 34 of module 30 and output 32 of FIR filter 28 are combined at a summing junction 36 to produce at its output 38 a refined input stream u*, which for a zero delay introduced by delay module 30 can be expressed as $$u^* = u + du,$$

where du is an incremental correction factor applied to a move command input. The general case in which the delay is nonzero can be expressed as $$u^*(n) = u(n-m) + du(n),$$

where n is the time index and m is the number of time steps the command inputs are delayed relative to output 32 of FIR filter 28.

The objective is to construct a FIR filter 28 with a set of filter coefficients that provide a generic solution of du values for all possible move command inputs, which can represent beam position moves of different lengths (e.g., short, medium, and long distances) and different move length sequences (e.g., short distance move, followed by another short distance move, followed by a long distance move). The approach for constructing FIR filter 28 entails first determining the incremental correction factors du for a finite set of command inputs u and then calculating the coefficients of FIR filter 28. This approach is carried out by a procedure that modifies the command input in an iterative manner to improve the match between the desired and actual system outputs. The stepwise iterative refinement procedure is as follows:

Step 1 entails initially setting du=0.

Step 2 entails passing u*=u+du through control system 10 and measuring the error stream, e, shown in FIG. 1. Thus, for du=0, u*=u, and e=u−y.

Step 3 entails comparing e to an operational tolerance, and if e is within the operational tolerance, ending the iterative procedure. The operational tolerance is defined by a cost function $$J(u) = \sum_{k=0}^{\infty} [y_d(k) - y(k)]^2,$$

where $y_d$ is the desired output and y is the measured output in response to the input stream u. The improvement in match is, therefore, defined as a reduction in the cost defined by J(u).

Step 4 entails, in the event error stream e is insufficiently small, reversing e in time and passing the time-reversed error stream, e*, through control system 10 as a command (even though it is an error measurement); collecting the measured output stream $y^*_e$ produced in response to e*; time-reversing the output stream $y^*_e$ to form $y_e$; setting $du_{next} = du + \alpha \cdot y_e$, where $\alpha$ is a dynamically adjusted correction gain or scale factor; and repeating Steps 2-4 for a number of iterations until e meets the operational tolerance constraint.

The value of $\alpha$ defined in Step 4 should be sufficiently small that first order approximations hold for the expression $$J(u+du) = J(u) + \nabla J(u) \cdot du,$$

such that setting du as $du = -\alpha \nabla J(u)$ with $\alpha > 0$, will, therefore, yield $$J(u+du) = J(u) - \alpha (\nabla J(u))^2,$$

which will ensure a reduction in the cost function J. During iterative refinement, the value of $\alpha$ is adjusted dynamically, beginning in the preferred embodiment, with $\alpha_0 = 0.3$. If the cost improves during one iteration, $\alpha$ is increased by 0.05 for the next iteration to a maximum of 0.6. If the cost degrades during one iteration, $\alpha$ is reduced by a factor of 2 and the current iteration is repeated, with the reduced refinement value of $\alpha$. This reduction of $\alpha$ continues until an improvement is achieved.

An Alternative Step 4 entails passing error stream e by mathematical simulation as a command through an adjoint closed-loop system, which is a computer modeled adjoint of a linear time invariant (LTI) model of the physical closed-loop system that comprises plant (G) 12, feedback controller (H) 18, and feedforward controller (F) 14; calculating the output stream y; and setting $$du_{next} = du + \alpha \cdot y_e.$$

The Alternative Step 4 uses a simulated adjoint system, which is created by mathematical modeling. Step 4 entails using the actual physical system to experimentally collect a measured output. Alternative Step 4 is inferior because it requires not only creation of a model but also the availability of a computer to do so.

The conclusion of the iterative refinement procedure produces a refinement stream du* such that the composite input $$u^* = u + du$$

yields a very good match to the desired output stream $y_d$. The refinement stream du* works, however, only for one particular input stream u to match a particular desired output stream $y_d$. Corrective input generator 16 transforms refining a particular input stream to a generic solution that works satisfactorily for arbitrary inputs. To do so, corrective input generator 16 implements a correction mapping to generate a similar refinement du* when its input is the original input stream u. A FIR filter is preferred in implementation of corrective input generator 16 because a FIR filter provides guaranteed stability, is of limited scope, and has coefficients calculated in a straightforward manner by applying standard least-squares algorithms.

The following describes a training profile that comprises various move lengths from which global FIR coefficients can be obtained immediately without having to assemble data from different input streams. The iterative refinement described above for N number of experimental command move lengths used in the teaching process can be expressed as $$u_1, u_2, \ldots u_N \rightarrow du_1, du_2, \ldots du_N \ N<\infty$$

The objective is to design a correction filter to map each u value to a corresponding du value. The FIR algorithm, which is embedded in a function of sum of products, can be expressed as $$\Delta(z)=a_0 z^m + a_1 z^{m-1} + \ldots + a_n z^{n-m},$$

where $a_0, a_1, \ldots, a_n$ represent the filter coefficients and m represents the FIR anticipation; i.e., m is the number of time steps the FIR filter signal path is ahead of the direct signal path. Numbers m and n are chosen in accordance with a trial and error process, and $a_0, a_1, \ldots, a_n$ are calculated through a least-squares algorithm. The quality of the resulting least-squares fit is assessed by observing the residual error. If the residual error is small, then control system 10 is operated with FIR filter 28 in place to determine how well it performs. If the control system performance is unacceptable, n', m, or both, are modified and new coefficients are calculated to start over the process.

The final configuration corrective input generator 16 of control system 10 equipped with the Cambridge Technology, Inc. Model 6220H galvanometer constitutes a 320-tap filter with a 160 kHz update rate and an anticipation of 80 taps to insert a 0.5 msec delay (shown as delay module 30) in the direct move command path but not in the path of FIR filter 28. This enables creation of an effectively non-causal filter (with 80 of the 320 taps before n=0). To ensure FIR filter 28 is a zero DC gain filter, the sum of all of its coefficients is zero. One way of accomplishing this result is to solve the first 319 coefficients and then to set the last coefficient to the negative sum of the first 319 FIR coefficients. The first 319 FIR coefficients are the least-squares solution to the problem $$Uh=du,$$

where $h=[h_1 \ h_2 \ \ldots \ h_{319}]^T$ are the independent FIR coefficients and $du=[du_1 \ du_2 \ \ldots \ du_M]^T$ is the correction sequence derived from a single training profile or assembled from multiple refinement runs.

The U matrix, which has 319 columns and M number of rows, contains the initial (ideal) input sequence in circular permutations, i.e., $$\begin{vmatrix} u_m & u_{m-1} & \cdots \\ u_{m+1} & u_m & \\ \vdots & \vdots & \\ u_M & u_{M-1} & \vdots \\ u_1 & u_M & \\ u_2 & u_1 & \\ \vdots & \vdots & \\ u_{m-1} & u_{m-2} & \cdots \end{vmatrix}.$$

The standard least-square solution can be obtained from $$h=(U^T*U)^{-1}*U^T*du.$$

The number of experimental command move lengths from which the FIR filter coefficients can be derived is N=2, one experiment representing a shorter length move command and the other representing a longer length move command.

Figure 3:
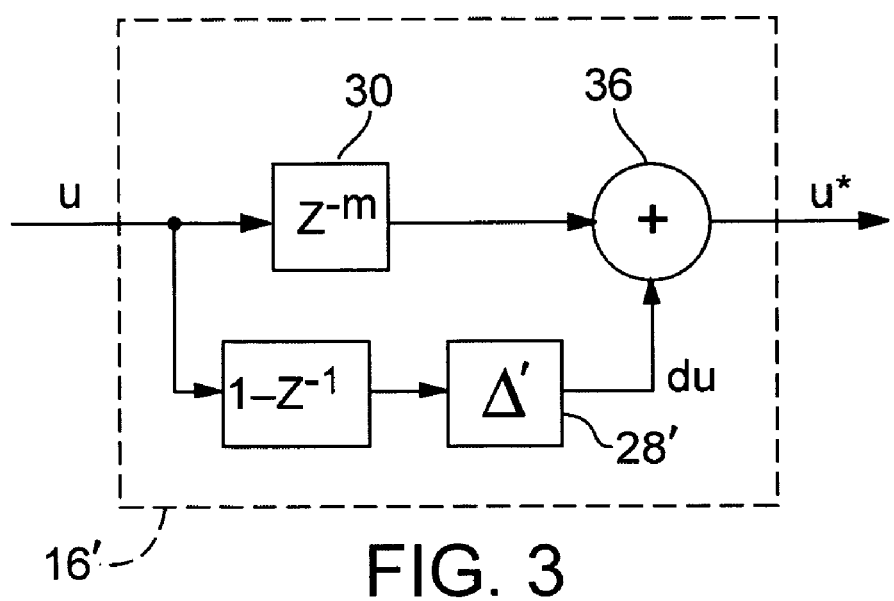
FIG. 3 is a block diagram of a particular implementation of the corrective input generator suitable for use in the control system of FIG. 1.

An alternative way to ensure FIR filter 28 is a zero DC gain filter is to recognize that to satisfy the condition $\Delta(1)=0$, z=1 has to be a root of the equation. The expression of $\Delta(z)$ is $$\Delta(z)=(1-z^{-1})\cdot\Delta',$$

in which all of the coefficients of $\Delta'$ are determined. FIG. 3 shows a block diagram of an alternative corrective input generator 16' implemented with a reconfigured FIR filter 28' as described above.

The scanning mirror of galvanometer 12 steers a laser beam toward a desired target location. Ideally, the actual mirror position, z, is directly proportional to the measured scanner position, y, or z=cy, where c is a known or measured constant value. Because the scanner position is measured through the joint encoder, the actual position of the mirror set at the free end of the scanner shaft does not match the measured position of the scanner shaft when it undergoes deflection during high acceleration position switching conditions. One reason for this difference is the finite stiffness of the mechanical coupling between the scanner shaft and the mirror. Thus, in reality, z=Sy, where S represents a dynamic filter characterizing the coupling between the measured scanner position and the actual mirror position on a Cambridge Technology, Inc. Model 6220H galvanometer.

Figure 4A:
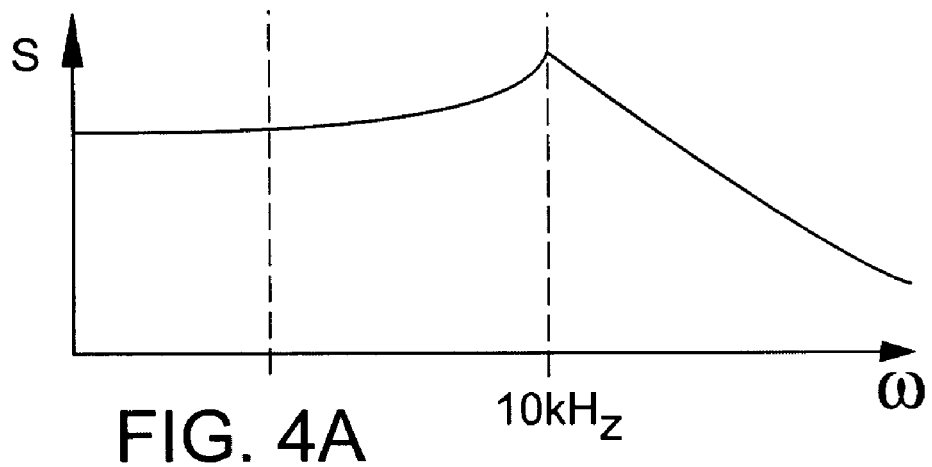
FIG. 4A shows the dynamic transfer function from the measured physical plant output to the load position of the control system of FIG. 1.
Figure 4B:
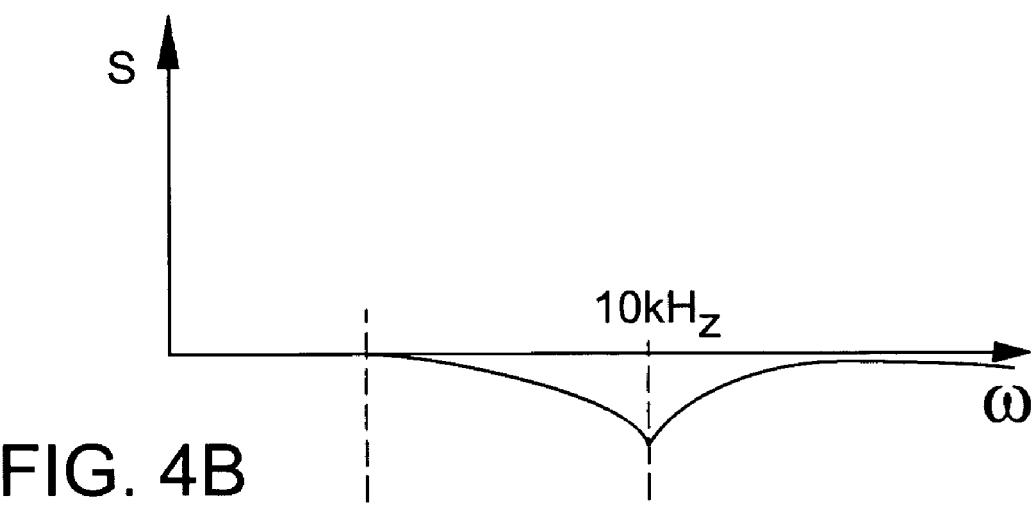
FIG. 4B shows the transfer function of a notch filter designed to counteract an amplitude spike in the dynamic transfer function of FIG. 4A.

FIG. 4A shows the dynamic filter transfer function S, which exhibits a peak amplitude value or spike at about 10 kHz. To compensate for the dynamic filtering effect, a system inverting notch filter having a transfer function as shown in FIG. 4B to counteract the 10 kHz spike is implemented in Step 2 of the iterative refinement procedure, in which originally $$e=u-y.$$

With a notch filter implementation contributing to the determination of FIR filter 28, $e=Nu-y$, where Nu is the notch filtered version of u. The notch filter compensation is made part of the calculation of FIR filter 28 to prevent the iterative refinement process from attempting to compensate for tracking errors about the notch frequency, inasmuch as the scanner measured position and actual mirror position are shown to diverge significantly in this frequency range.

The use of corrective input generator 16 implemented as described above and installed in a laser beam positioning system enables operating a galvanometer at higher accelerations and wider bandwidths than those previously used to position a laser beam. The consequence is an increase of about 25 percent in target specimen servo performance.

It will be obvious to those having skill in the art that many changes may be made to the details of the above-described embodiments without departing from the underlying principles of the invention. For example, alternative implementations of a corrective input generator may include, inter alia, an infinite impulse response (IIR) filter, combination IIR and FIR filters, or nonlinear filtering approaches such as neural networks. The scope of the present invention should, therefore, be determined only by the following claims.

The invention claimed is:

1. A high-speed precision servomechanism control system, comprising:
    a closed-loop control servomechanism implemented with feedback control and feedforward compensation to control output states of a physical plant in response to a command input stream applied to the control system; and
    a corrective input generator responsive to the command input stream to provide a refined input stream to which the physical plant responds to achieve within an operational tolerance a desired output state corresponding to the command input stream, the corrective input generator implemented with correction input mapping that provides for an arbitrary command input stream a match solution causing the physical plant to achieve the desired output state corresponding to the arbitrary command input stream, the corrective input generator comprising a FIR filter having an output and implemented with filter coefficients computed to provide the match solution, and the corrective input generator implemented with an input delay to the arbitrary command input stream combined with the output of the FIR filter to produce the refined input stream.

2. A high-speed precision servomechanism control system, comprising:
    a closed-loop control servomechanism implemented with feedback control and feedforward compensation to control output states of a physical plant in response to a command input stream applied to the control system, the output states representing motion and the physical plant representing a beam steering device and power drive electronics operating as part of a laser beam positioning system; and
    a corrective input generator responsive to the command input stream to provide a refined input stream to which the physical plant responds to achieve within an operational tolerance a desired output state corresponding to the command input stream, the corrective input generator implemented with correction input mapping that provides for an arbitrary command input stream a match solution causing the physical plant to achieve the desired output state corresponding to the arbitrary command input stream.

3. The control system of claim 2, in which the command input stream represents desired laser beam position displacements.

4. The control system of claim 2, in which a dynamic filter transfer function exhibiting a spike at a particular frequency characterizes the operation of the beam steering device, and in which the correction input mapping implemented in the corrective input generator includes a notch filter having a transfer function that counteracts the spike at the particular frequency.

5. The control system of claim 4, in which the corrective input generator comprises a FIR filter implemented with filter coefficients computed to provide the match solution including the notch filter.

6. The control system of claim 4, in which the beam steering device includes a galvanometer.

7. The control system of claim 2, in which the beam steering device includes a galvanometer.

8. A method of establishing a high-speed precision servomechanism control system that includes a closed-loop control servomechanism implemented with feedback control and feedforward compensation to control output states of a physical plant in response to a command input stream, comprising:
    providing a corrective input generator responsive to the command input stream to produce a refined input stream to which the physical plant responds; and
    performing an iterative command input refinement procedure to implement correction input mapping that provides for an arbitrary command input stream a match solution causing the physical plant to achieve within an operational tolerance a desired output state corresponding to the arbitrary command input stream, the performing an iterative command input refinement procedure including:
        (a) applying a refined input command to the servomechanism control system and measuring its output stream, the refined input command including a nominal command input and an incremental correction factor;
        (b) measuring an error stream representing a difference between the nominal command input and the measured output stream;
        (c) comparing the error stream to an operational tolerance, and whenever the error stream exceeds the operational tolerance, reversing the error stream in time to form a time-reversed error stream, applying the time-reversed error stream as a command to the servomechanism control system and measuring its output stream, time-reversing the measured output stream to form a time-reversed version of the measured output stream, and determining a next refined input command representing a sum of the incremental correction factor and the product of a dynamically adjusted correction gain and the time-reversed version of the measured output stream; and
        (d) repeating the preceding steps (a), (b), and (c) until the error stream is within the operational tolerance.

9. A method of establishing a high-speed precision servomechanism control system that includes a closed-loop control servomechanism implemented with feedback control and feedforward compensation to control output states of a physical plant in response to a command input stream, comprising:
    providing a corrective input generator responsive to the command input stream to produce a refined input stream to which the physical plant responds; and
    performing an iterative command input refinement procedure to implement correction input mapping that provides for an arbitrary command input stream a match solution causing the physical plant to achieve within an operational tolerance a desired output state corresponding to the arbitrary command input stream, the performing an iterative command input refinement procedure including:

(a) applying a refined input command to the servomechanism control system and measuring its output stream, the refined input command including a nominal command input and an incremental correction factor;

(b) measuring an error stream representing a difference between the nominal command input and the calculated output stream;

(c) comparing the measured error stream to an operational tolerance, and whenever the error stream exceeds the operational tolerance, applying by mathematical simulation the measured error stream as a command to the modeled adjoint of the closed-loop control servomechanism and calculating an output stream, and determining a next refined input command representing a sum of the incremental correction factor and the product of a dynamically adjusted correction gain and the calculated output stream; and (d) repeating the preceding steps (a), (b), and (c) until the measured error stream is within the operational tolerance.

10. A method of establishing a high-speed precision servomechanism control system that includes a closed-loop control servomechanism implemented with feedback control and feedforward compensation to control output states of a physical plant in response to a command input stream, comprising:

providing a corrective input generator responsive to the command input stream to produce a refined input stream to which the physical plant responds; and performing an iterative command input refinement procedure to implement correction input mapping that provides for an arbitrary command input stream a match solution causing the physical plant to achieve within an operational tolerance a desired output state corresponding to the arbitrary command input stream, the corrective input generator comprising a FIR filter having an output and implemented with filter coefficients computed to provide the match solution, and the corrective input generator implemented with an input delay to the arbitrary command input stream combined with the output of the FIR filter to produce the refined input stream.

11. A method of establishing a high-speed precision servomechanism control system that includes a closed-loop control servomechanism implemented with feedback control and feedforward compensation to control output states of a physical plant in response to a command input stream, comprising:

providing a corrective input generator responsive to the command input stream to produce a refined input stream to which the physical plant responds, the output states representing motion and the physical plant representing a beam steering device and power drive electronics operating as part of a laser beam positioning system; and performing an iterative command input refinement procedure to implement correction input mapping that provides for an arbitrary command input stream a match solution causing the physical plant to achieve within an operational tolerance a desired output state corresponding to the arbitrary command input stream.

12. The control system of claim 11, in which the command input stream represents desired laser beam position displacements.

13. The control system of claim 11, in which a dynamic filter transfer function exhibiting a spike at a particular frequency characterizes the operation of the beam steering device, and in which the correction input mapping implemented in the corrective input generator includes a notch filter having a transfer function that counteracts the spike at the particular frequency.

14. The control system of claim 13, in which the corrective input generator comprises a FIR filter implemented with filter coefficients computed to provide the match solution including the notch filter.

15. The method of claim 13, in which the beam steering device includes a galvanometer.

16. The method of claim 11, in which the beam steering device includes a galvanometer.

* * * * *

UNITED STATES PATENT AND TRADEMARK OFFICE
CERTIFICATE OF CORRECTION

PATENT NO. : 7,345,448 B2
APPLICATION NO. : 11/129059
DATED : March 18, 2008
INVENTOR(S) : David Watt et al.

It is certified that error appears in the above-identified patent and that said Letters Patent is hereby corrected as shown below:

Column 1
Line 13, change "Gran" to --Grant--.
Line 13, change "GMS" to --CMS--.

Column 2
Line 51, delete ",".

Column 4
Line 41, change "a" to --$\alpha$--.

Column 10
Line 23, change "control system" to --method--.
Line 26, change "control system" to --method--.
Line 33, change "control system" to --method--.

Signed and Sealed this

Twenty-fourth Day of June, 2008

JON W. DUDAS
*Director of the United States Patent and Trademark Office*